(12) United States Patent
Makke et al.

(10) Patent No.: US 12,139,146 B2
(45) Date of Patent: Nov. 12, 2024

(54) VEHICLE DATA TRANSMISSION

(71) Applicant: Ford Global Technologies, LLC, Dearborn, MI (US)

(72) Inventors: Omar Makke, Oakland, MI (US); Jeremy Lerner, Southfield, MI (US); Oleg Gusikhin, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 17/814,880

(22) Filed: Jul. 26, 2022

(65) Prior Publication Data

US 2024/0034329 A1  Feb. 1, 2024

(51) Int. Cl.
 *B60W 40/08*  (2012.01)
 *G07C 5/00*  (2006.01)
(52) U.S. Cl.
 CPC .............. *B60W 40/08* (2013.01); *G07C 5/008* (2013.01); *B60W 2540/215* (2020.02)
(58) Field of Classification Search
 CPC .................................................. B60W 40/08
 See application file for complete search history.

(56) References Cited

U.S. PATENT DOCUMENTS

| 9,112,833 | B2 | 8/2015 | Bowes et al. |
| 10,698,927 | B1 | 6/2020 | Chin et al. |
| 11,787,048 | B2 * | 10/2023 | Butterfoss ............... B25J 9/1661 |
| | | | 700/255 |
| 2012/0089775 | A1 | 4/2012 | Ranade et al. |
| 2017/0142187 | A1 | 5/2017 | Pimentel |
| 2021/0069905 | A1 * | 3/2021 | Zhang ..................... B25J 9/1664 |
| 2021/0163021 | A1 * | 6/2021 | Frazzoli .................. H04W 4/48 |
| 2024/0034329 | A1 * | 2/2024 | Makke .................... G07C 5/008 |

OTHER PUBLICATIONS

Simovici et al., "Compression and Data Mining", Journal of Communications vol. 10, No. 9, Sep. 2015.

* cited by examiner

*Primary Examiner* — Michael A Berns
(74) *Attorney, Agent, or Firm* — Christopher Storms; Bejin Bieneman PLC

(57) ABSTRACT

A system includes a computer on board a vehicle and a server remote from the vehicle. The computer and the server each store a network graph of actions performable by components of the vehicle that includes costs of transitioning between the actions. The computer is programmed to log a sequence of the actions; upon determining that a sub-sequence of the sequence constitutes a lowest-cost path from the beginning action to the final action based on the network graph, store a reduced sequence including a beginning action and a final action of the sub-sequence ordered immediately after the beginning action, the reduced sequence excluding at least one intermediate action from the sub-sequence; and transmit the reduced sequence to a server remote from the vehicle. The server is programmed to determine the sequence from the reduced sequence based on the network graph.

19 Claims, 4 Drawing Sheets

VEHICLE DATA TRANSMISSION

BACKGROUND

Modern vehicles often include a plurality of systems that generate data. The systems can perform actions upon receiving inputs from an operator or upon detecting other trigger events. The systems can control motion of the vehicle, such as by a propulsion system, brake system, and steering system. The systems can control the experience of occupants of a passenger cabin of the vehicle, such as by a climate-control system and an infotainment system.

DETAILED DESCRIPTION

Figure 1:
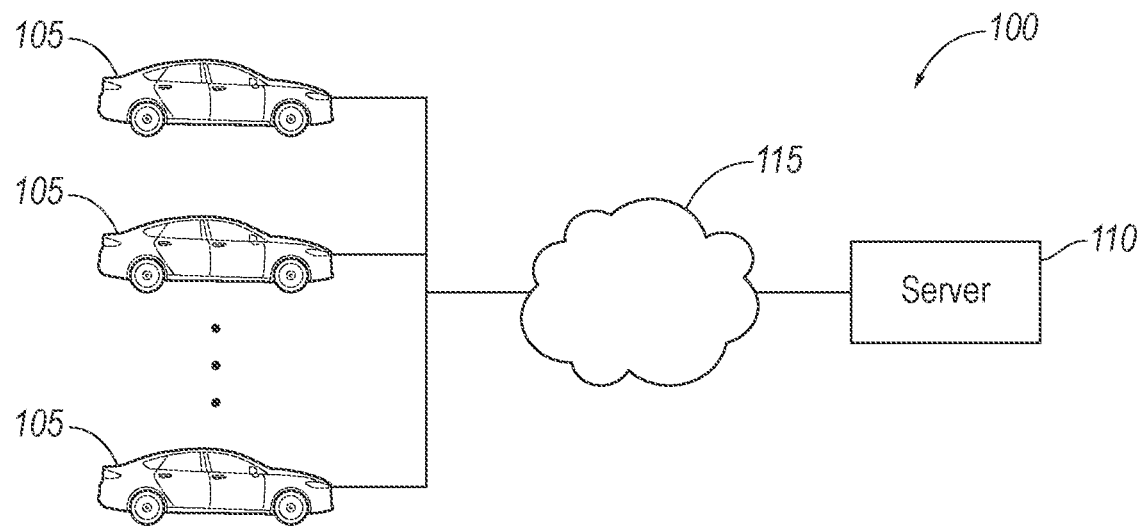
FIG. 1 is a block diagram of an example plurality of vehicles in communication with a server.

Systems and methods described herein provide an efficient way to collect, communicate, and store vehicle data generated during operation of the vehicle. Vehicles can generate large quantities of data, and collecting, including communicating and storing, all of that data may be impractical and/or technically infeasible because of limitations in available memory and/or computer network bandwidth, for example.

To collect and store the vehicle data, a computer on board the vehicle and a server remote from the vehicle can both store a network graph of actions performable by components of the vehicle. Nodes of the graph can represent the actions, and directed links from one node to another can represent the order in which those actions are performed. The network graph includes costs of transitioning between the actions. For example, the costs can represent probabilities of performing an action, given the action that has just been performed, e.g., based on historical data collected from many vehicles.

The computer on board the vehicle can log a sequence of the actions and determine whether any sub-sequences in the sequence constitute a lowest-cost path from the beginning action of the sub-sequence to the final action of the sub-sequence. The lowest-cost path between the beginning and final actions is the path following the network graph for which the total costs of transitioning from the beginning action to the final action are the lowest. Upon determining that the sub-sequence is the lowest-cost path, the computer stores a reduced sequence, which excludes the intermediate actions of the sub-sequence between the first action and the final action, and transmits the reduced sequence to the server. The server can then use the network graph to insert the excluded intermediate actions back into the received sequence to reconstruct the unreduced sequence.

A system includes a computer on board a vehicle and a server remote from the vehicle. The computer and the server each store a network graph of actions performable by components of the vehicle. The network graph includes costs of transitioning between the actions. The computer is programmed to log a sequence of the actions, the sequence including a beginning action, at least one intermediate action ordered immediately after the beginning action, and a final action ordered immediately after the at least one intermediate action; upon determining that the beginning action, the at least one intermediate action, and the final action constitute a lowest-cost path from the beginning action to the final action based on the network graph, store a reduced sequence including the beginning action and the final action ordered immediately after the beginning action, the reduced sequence excluding the at least one intermediate action; and transmit the reduced sequence to a server remote from the vehicle. The server is programmed to determine the sequence from the reduced sequence based on the network graph.

The programming on the server to determine the sequence may include programming to insert the at least one intermediate action from the lowest-cost path from the beginning action to the final action into the reduced sequence between the beginning action and the final action.

The vehicle may be a first vehicle, and the server may be further programmed to generate the network graph based on data from a plurality of second vehicles, and transmit the network graph to the first vehicle.

The server may be further programmed to change the costs of transitioning between the actions in the network graph based on the reduced sequence.

A computer includes a processor and a memory, and the memory stores instructions executable by the processor to store a network graph of actions performable by components of a vehicle, the network graph including costs of transitioning between the actions; log a sequence of the actions, the sequence including a beginning action, at least one intermediate action ordered immediately after the beginning action, and a final action ordered immediately after the at least one intermediate action; upon determining that the beginning action, the at least one intermediate action, and the final action constitute a lowest-cost path from the beginning action to the final action based on the network graph, store a reduced sequence including the beginning action and the final action ordered immediately after the beginning action, the reduced sequence excluding the at least one intermediate action; and transmit the reduced sequence to a server remote from the vehicle.

The actions may include commands inputtable by an occupant of the vehicle.

The instructions may further include instructions to determine a cost of transitioning through the beginning action, the at least one intermediate action, and the final action. Determining the cost may include summing the costs of transitioning between the actions from the beginning action through the at least one intermediate action to the final action from the network graph.

The instructions may further include instructions to determine a lowest cost of the lowest-cost path from the beginning action to the final action from the network graph, and determining that the beginning action, the at least one intermediate action, and the final action constitute a lowest-cost path from the beginning action to the final action may include determining that the cost equals the lowest cost.

The costs of transitioning between the actions may be based on probabilities of transitioning between the actions. The costs of transitioning between the actions may be based only on the probabilities of transitioning between the actions.

Each cost of transitioning between a pair of the actions may equal one minus the probability of transitioning between the pair of the actions.

The probabilities may be based on averages of historical data of transitioning between the actions. The vehicle may be a first vehicle, and the historical data may be from a plurality of second vehicles.

The beginning action may be a first beginning action; the at least one intermediate action may be a first at least one intermediate action; the final action may be a first final action; the sequence may include a second beginning action, a second at least one intermediate action ordered immediately after the second beginning action, and a second final action ordered immediately after the at least one intermediate action; and the instructions may further include instructions to, upon determining that the second beginning action, the second at least one intermediate action, and the second final action do not constitute a lowest-cost path from the beginning action to the final action based on the network graph, include the second beginning action, the second at least one intermediate action, and the second final action in the reduced sequence.

The at least one intermediate action may include a first intermediate action, at least one second intermediate action immediately after the first intermediate action, and a third intermediate action immediately after the at least one second intermediate action; and the instructions may further include instructions to, upon determining that the beginning action, the at least one intermediate action, and the final action do not constitute a lowest-cost path from the beginning action to the final action based on the network graph and determining that the first intermediate action, the at least one second intermediate action, and the third intermediate action constitute a lowest-cost path from the first intermediate action to the third intermediate action based on the network graph, include the first intermediate action and the third intermediate action in the reduced sequence and exclude the at least one second intermediate action from the reduced sequence.

The instructions may further include instructions to receive the network graph from the server.

The network graph may be a directed graph.

The network graph may be a weighted graph with the costs of transitioning serving as weights of the weighted graph.

A method includes storing a network graph of actions performable by components of a vehicle, the network graph including costs of transitioning between the actions; logging a sequence of the actions, the sequence including a beginning action, at least one intermediate action ordered immediately after the beginning action, and a final action ordered immediately after the at least one intermediate action; upon determining that the beginning action, the at least one intermediate action, and the final action constitute a lowest-cost path from the beginning action to the final action based on the network graph, storing a reduced sequence including the beginning action and the final action ordered immediately after the beginning action, the reduced sequence excluding the at least one intermediate action; and transmitting the reduced sequence to a server remote from the vehicle.

With reference to the Figures, wherein like numerals indicate like parts throughout the several views, a system 100 includes a computer 200 on board a vehicle 105 and a server 110 remote from the vehicle 105. The computer 200 and the server 110 each store a network graph 300 of actions 305 performable by components 205 of the vehicle 105. The network graph 300 includes costs 315 of transitioning between the actions 305. The computer 200 is programmed to log a sequence of the actions 305, the sequence including a beginning action 305, at least one intermediate action 305 ordered immediately after the beginning action 305, and a final action 305 ordered immediately after the at least one intermediate action 305; upon determining that the beginning action 305, the at least one intermediate action 305, and the final action 305 constitute a lowest-cost path from the beginning action 305 to the final action based on the network graph 300, store a reduced sequence including the beginning action 305 and the final action 305 ordered immediately after the beginning action 305, the reduced sequence excluding the at least one intermediate action 305; and transmit the reduced sequence to a server 110 remote from the vehicle 105. The server 110 is programmed to determine the sequence from the reduced sequence based on the network graph 300.

With reference to FIG. 1, the server 110 may communicate with a plurality of the vehicles 105. The vehicles 105 may each be any passenger or commercial automobile such as a car, a truck, a sport utility vehicle, a crossover, a van, a minivan, a taxi, a bus, a jeepney, etc.

The vehicles 105 can communicate with the server 110 over a network 115. The network 115 represents one or more mechanisms by which the server 110 may communicate with remote entities. Accordingly, the network 115 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 110 is a microprocessor-based computing device, e.g., a generic computing device including a processor and a memory. The memory of the server 110 can include media for storing instructions executable by the processor as well as for electronically storing data and/or databases. The server 110 can be multiple computers coupled together. The server 110 is remote from the vehicle 105, i.e., located at a place that is spaced from the vehicle 105 and may be distant from the vehicle 105.

Figure 2:
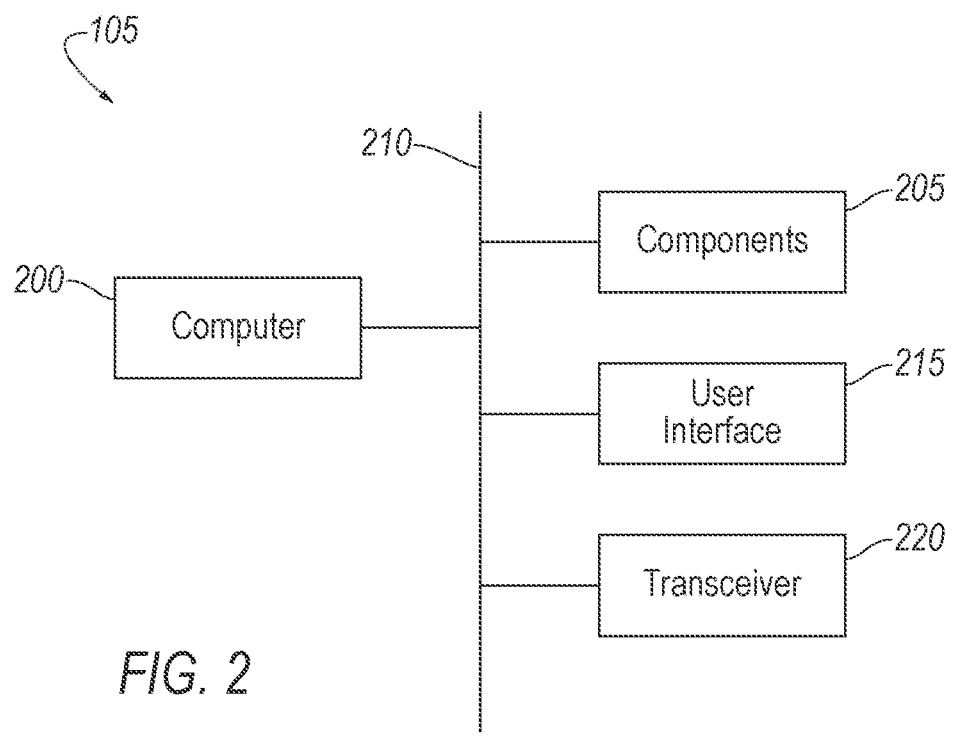
FIG. 2 is a block diagram of one of the vehicles.

With reference to FIG. 2, each vehicle 105 can include a respective computer 200 on board the vehicle 105. The computer 200 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 200 can thus include a processor, a memory, etc. The memory of the computer 200 can include media for storing instructions executable by the processor as well as for electronically storing data and/or databases, and/or the computer 200 can include structures such as the foregoing by which programming is provided. The computer 200 can be multiple computers coupled together on board the vehicle 105.

The computer 200 may transmit and receive data on board the vehicle 105 through a communications network 210. The communications network 210 can be a controller area network (CAN) bus, Ethernet, WiFi, Local Interconnect Network (LIN), onboard diagnostics connector (OBD-II), and/ or by any other wired or wireless communications network. The computer 200 may be communicatively coupled to a plurality of components 205, a user interface 215, and a transceiver 220.

The components 205 can include any components of the vehicle 105 that can actuate or change states. For example, the components 205 may include components of a propulsion system such as an accelerator pedal, a transmission, etc.; components of a brake system such as a brake pedal, brake actuators, etc.; components of a steering system such as a steering wheel, an electric power assisted steering (EPAS) actuator, etc.; components of a climate-control system such as temperature dials, an air-conditioning unit, vents actuatable to direct airflow, a heater, etc.; components of an infotainment system such as buttons, dials, a touchscreen, a screen, etc.

The user interface 215 presents information to and receives information from an occupant of the vehicle 105. The user interface 215 may be located, e.g., on an instrument panel in a passenger cabin of the vehicle 105, or wherever may be readily seen by the occupant. The user interface 215 may include dials, digital readouts, screens, speakers, and so on for providing information to the occupant, e.g., human-machine interface (HMI) elements such as are known. The user interface 215 may include buttons, knobs, keypads, a microphone, and so on for receiving information from the occupant. The components 205 may include parts of the user interface 215.

The transceiver 220 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 220 may be adapted to communicate with a remote server, that is, a server distinct and spaced from the vehicle 105, such as the server 110. The remote server may be located outside the vehicle 105. For example, the remote server may be associated with another vehicle (e.g., V2V communications), an infrastructure component (e.g., V2I communications), an emergency responder, a mobile device associated with the owner of the vehicle 105, etc. The transceiver 220 may be one device or may include a separate transmitter and receiver.

Figure 3:
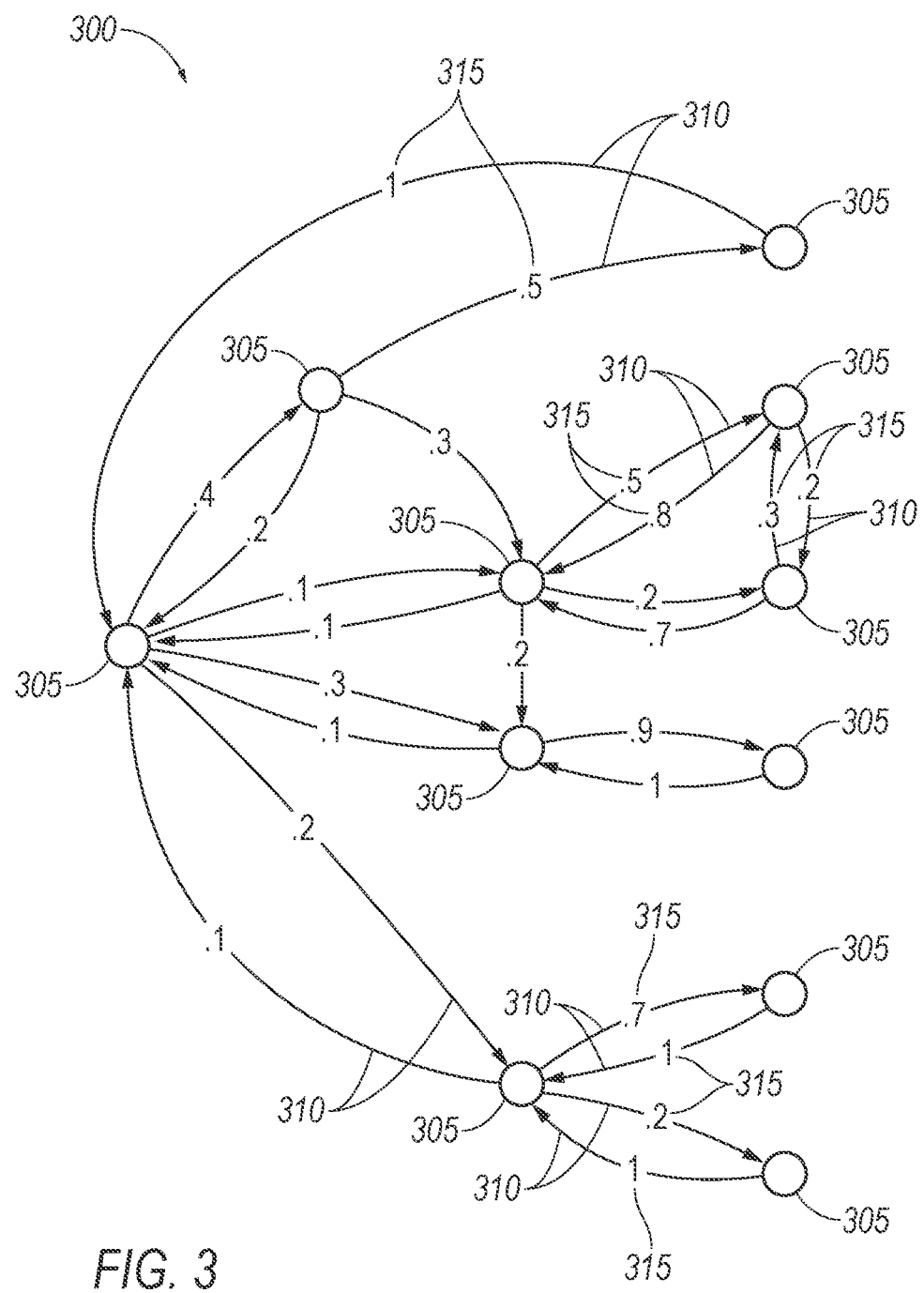
FIG. 3 is a diagram of an example network graph of actions performable by components of the vehicle.

With reference to FIG. 3, the computer 200 and the server 110 each store the network graph 300. For the purposes of this disclosure, a network graph is a structure having a plurality of entities or objects, some of which have pairwise relationships. In a network graph, the entities or objects are represented by nodes (also called vertices or points), and the pairwise relationships are represented by links connecting pairs of nodes (also called lines or edges). In this application, the nodes represent the actions 305 performable by the components 205 of the vehicle 105, and the links represent transitions 310 from one action 305 to an immediately following action 305. For example, the computer 200 and the server 110 may store the network graph 300 as a set of transitions 310 and corresponding costs 315 (described below), e.g., for a set of actions 305 X, Y, Z, the network graph 300 can be represented in memory as $\{\{X, Y, c_{XY}\}, \{X, Z, c_{XZ}\}, \{Y, Z, c_{YZ}\}, \{Z, X, c_{ZX}\}\}$, in which $c_{ij}$ denotes the costs 315 of the transition 310 from the ith action 305 to the jth action 305 (in which the labels i and j are indexes of the actions 305, not necessarily an ordering of the actions 305).

The actions 305 may include actuations of the components 205, changes in state of the components 205, commands inputtable by an occupant of the vehicle 105, etc. For example, actions 305 of the propulsion system can include increasing acceleration upon the accelerator pedal being depressed, shifting from second gear to third gear, etc.; actions 305 of the infotainment system can include increasing or decreasing volume, showing a menu of media sources upon receiving a touchscreen or button press command to do so, showing a menu of playable media files from one of the media sources upon receiving a command to do so, pairing with a mobile device over a wireless connection, etc.

The transitions 310 are pairs of the actions 305 in which one of the pair of actions 305 immediately follows the other of the pair of actions 305, e.g., showing the menu of media sources and then showing the media files on a selected media source. (For clarity, not all of the transitions 310 are labeled in FIG. 3.) The transitions 310 are represented by directed links, i.e., links representing asymmetrical relationships. The links are shown as arrows pointing from the first action 305 of the pair to the second action 305 of the pair. The network graph 300 is thus a directed graph. A pair of actions 305 may have directed links in both directions, a directed link in just one direction, or no links. Directed links in both directions means that it is possible for one action 305 to be followed by the other action 305 and vice versa, e.g., subsequent menu screens in which the second menu screen has a "back" option to return to the first menu screen. A directed link in just one direction means that it is possible for one action 305 to be followed by the other action 305 but not vice versa, e.g., a nested menu that has an option to return to a top-level menu, and the top-level menu does not have an option to go to the nested menu. No links means that neither action 305 can directly follow the other one, e.g., the propulsion system cannot switch from a forward gear to a reverse gear or vice versa without passing through "neutral."

The network graph 300 includes costs 315 of transitioning between the actions 305. (For clarity, not all of the costs 315 are labeled in FIG. 3.) The costs 315 are numerical values each associated with one of the transitions 310. The network graph 300 is thus a weighted graph with the costs 315 serving as weights of the weighted graph. The costs 315 of transitioning between the actions 305 may be at least partially based on probabilities of transitioning between the actions 305, e.g., based only on the probabilities of transitioning between the actions 305. A lower cost 315 can indicate a higher probability, and vice versa, meaning that paths traveled more frequently are more likely to permit the intermediate actions 305 to be excluded, as described below. For example, each cost 315 of transitioning between a pair of the actions 305 equals one minus the probability of transition between the pair of the actions 305, e.g., $c_{ij}=1-P(A_j|A_i)$, in which c is the cost 315, i is an index of the first action 305 of the pair, j is an index of the second action 305 of the pair, and A represents the action 305. The probabilities can be based on averages of historical data of transitioning between the actions 305, e.g., from a plurality of vehicles 105 that may or may not include the vehicle 105 on which the network graph 300 is stored. For example, the server 110 may receive a plurality of the sequences logged by a plurality of vehicles 105, generate the network graph 300 from the sequences, and transmit the network graph 300 to the vehicle 105.

The server 110 may be programmed to generate the network graph 300 based on data from the plurality of vehicles 105, e.g., sequences. The actions 305 and the transitions 310 are known from the design of the vehicle 105, and the server 110 can translate the actions 305 and the transitions 310 into the nodes and the links, respectively. The server 110 can determine the costs 315 from the sequences received from the plurality of the vehicles 105. For example, the probability of transitioning from the ith action 305 to the jth action 305, $P(A_j|A_i)$, can be the number of transitions from the ith action 305 to the jth action 305 in the sequences divided by the number of transitions 310 from the ith action 305 to any action 305 in the sequences.

The computer 200 and/or the server 110 can be programmed to determine a cost of transitioning through a sub-sequence of the actions 305. The sub-sequence may include a beginning action 305, at least one intermediate action 305, and a final action 305, in that order, e.g., {W, X, Y, Z}, in which W is the beginning action 305, X and Y are the intermediate actions 305, and Z is the final action 305. Determining the cost may include summing the costs 315 of transitioning between the actions 305 from the beginning action 305 through the at least one intermediate action 305 to the final action 305 from the network graph 300, e.g., $c_{WXYZ}=c_{WX}+c_{XY}+c_{YZ}$, in which $c_{WX}$ is the cost 315 of the transition 310 {W, X}, and so on.

The computer 200 and/or the server 110 can be programmed to determine a lowest-cost path and a lowest cost of the lowest-cost path from the beginning action 305 to the final action 305 from the network graph 300. For example, the computer 200 and/or the server 110 can list the possible paths from the beginning action 305 to the final action 305, e.g., {{W, Z}}, {{W, X}, {X, Z}}, {{W, X}, {X, Y}, {Y, Z}}, etc. The computer 200 and/or the server 110 can then determine the cost of each path as described above. The smallest of those costs is the lowest cost, and the path corresponding to the lowest cost is the lowest-cost path.

The computer 200 can be programmed to log a sequence of the actions 305, i.e., store the sequence of the actions 305 in memory in a nontransitory manner.

The computer 200 can be programmed to determine whether a sub-sequence constitutes a lowest-cost path based on the network graph 300. The sub-sequence can be all or a portion of the sequence. The sub-sequence may include a beginning action 305, at least one intermediate action 305 ordered immediately after the beginning action 305, and a final action 305 ordered immediately after the at least one intermediate action 305. To determine that the sub-sequence constitutes the lowest-cost path, the computer 200 may determine the lowest-cost path between the beginning action 305 and the final action 305 and then determine whether the sub-sequence matches that lowest-cost path. Alternatively, the computer 200 may determine the cost of the sub-sequence, determine the lowest cost, and determine whether the cost of the sub-sequence equals the lowest cost.

The computer 200 is programmed to, upon determining that the sub-sequence constitutes the lowest-cost path from the beginning action 305 to the final action 305, store a reduced sequence including the beginning action 305 and the final action 305 ordered immediately after the beginning action 305. The reduced sequence excludes the at least one intermediate action 305. The reduced sequence can be the sequence with the at least one intermediate action 305 removed. For example, if the sequence is {W, X, Y, Z} and {X, Y, Z} is a lowest-cost path, then the reduced sequence is {W, X, Z}.

The computer 200 may be programmed to, upon determining that the beginning action 305, the at least one intermediate action 305, and the final action 305 do not constitute a lowest-cost path from the beginning action 305 to the final action 305, include the beginning action 305, the at least one intermediate action 305, and the final action 305 in the reduced sequence. For example, if the sequence is {W, X, Y, Z} and {X, Y, Z} is not a lowest-cost path, then the reduced sequence is still {W, X, Y, Z}.

The computer 200 may be programmed to, starting from the sequence as logged, iteratively select a sub-sequence from the sequence, determine whether the sub-sequence is a lowest-cost path, and either exclude or include the intermediate actions 305 of the sub-sequence in the reduced sequence, with each iteration starting from the reduced sequence from the previous iteration. For example, the computer 200 may proceed from longer sub-sequences to shorter sub-sequences, and, for each length of sub-sequence, from beginning to end or end to beginning. For a sequence {U, V, W, X, Y, Z}, the computer 200 may first determine whether {U, V, W, X, Y, Z} is a lowest-cost path from U to Z. If so, the reduced sequence is {U, Z}. If not, the computer 200 may determine whether {U, V, W, X, Y} is a lowest-cost path. If so, the reduced sequence is {U, Y, Z}. If not, the computer 200 may determine whether {V, W, X, Y, Z} is a lowest-cost path. If not, the iteration would then proceed through {U, V, W, X}, {V, W, X, Y}, {W, X, Y, Z}, {U, V, W}, {V, W, X}, {W, X, Y}, {X, Y, Z}. The beginning and/or final actions 305 of a given iteration may have been intermediate actions 305 for a previous iteration. The iterations may end after checking the sub-sequences with a length of three actions 305 or when the reduced sequence has a length of three or fewer actions 305.

Alternatively or additionally, the computer 200 may be programmed to, upon logging a next action 305 into the sequence, iteratively select a sub-sequence including the next action 305 from the sequence, and either exclude or include the intermediate actions 305 of the sub-sequence in the reduced sequence, with each iteration starting from the reduced sequence from the previous iteration. For example, the computer 200 may proceed from longer sub-sequences including the next action 305 to shorter sub-sequences including the next action 305. For a sequence {U, V, W, X, Y, Z} in which the action 305 Z has just been logged, the computer 200 may first determine whether {U, V, W, X, Y, Z} is a lowest-cost path from U to Z. If so, the reduced sequence is {U, Z}. If not, the computer 200 may determine whether {V, W, X, Y, Z} is a lowest-cost path. If so, the reduced sequence is {U, V, Z}. If not, the computer 200 may determine whether {W, X, Y, Z} is a lowest-cost path. If not, the iteration would then proceed to {X, Y, Z}. The iterations may end after checking the sub-sequences with a length of three actions 305 or when the reduced sequence has a length of three or fewer actions 305.

The computer 200 may be programmed to, after finishing the iterations of checking for lowest-cost paths, transmit the reduced sequence to the server 110. For example, the computer 200 may instruct the transceiver 220 to transmit the reduced sequence to the server 110.

The server 110 may be programmed to determine the sequence from the reduced sequence based on the network graph 300. For example, the server 110 may determine the lowest-cost path for each consecutive pair of actions 305 in the reduced sequence. For the reduced sequence {U, V, X, Y, Z}, the computer 200 may determine the lowest-cost paths for {U, V}, {V, X}, {X, Y}, and {Y, Z}. The, the server 110 may insert the actions 305 from the lowest-cost path from the beginning action 305 to the final action 305 into the reduced sequence between the beginning action 305 and the final action 305, e.g., if the lowest-cost path for {V, X} is {V, W, X}, then the server 110 inserts the intermediate action 305 W between the beginning action 305 V and the final action 305 X to arrive at the sequence {U, V, W, X, Y, Z}.

Figure 4:
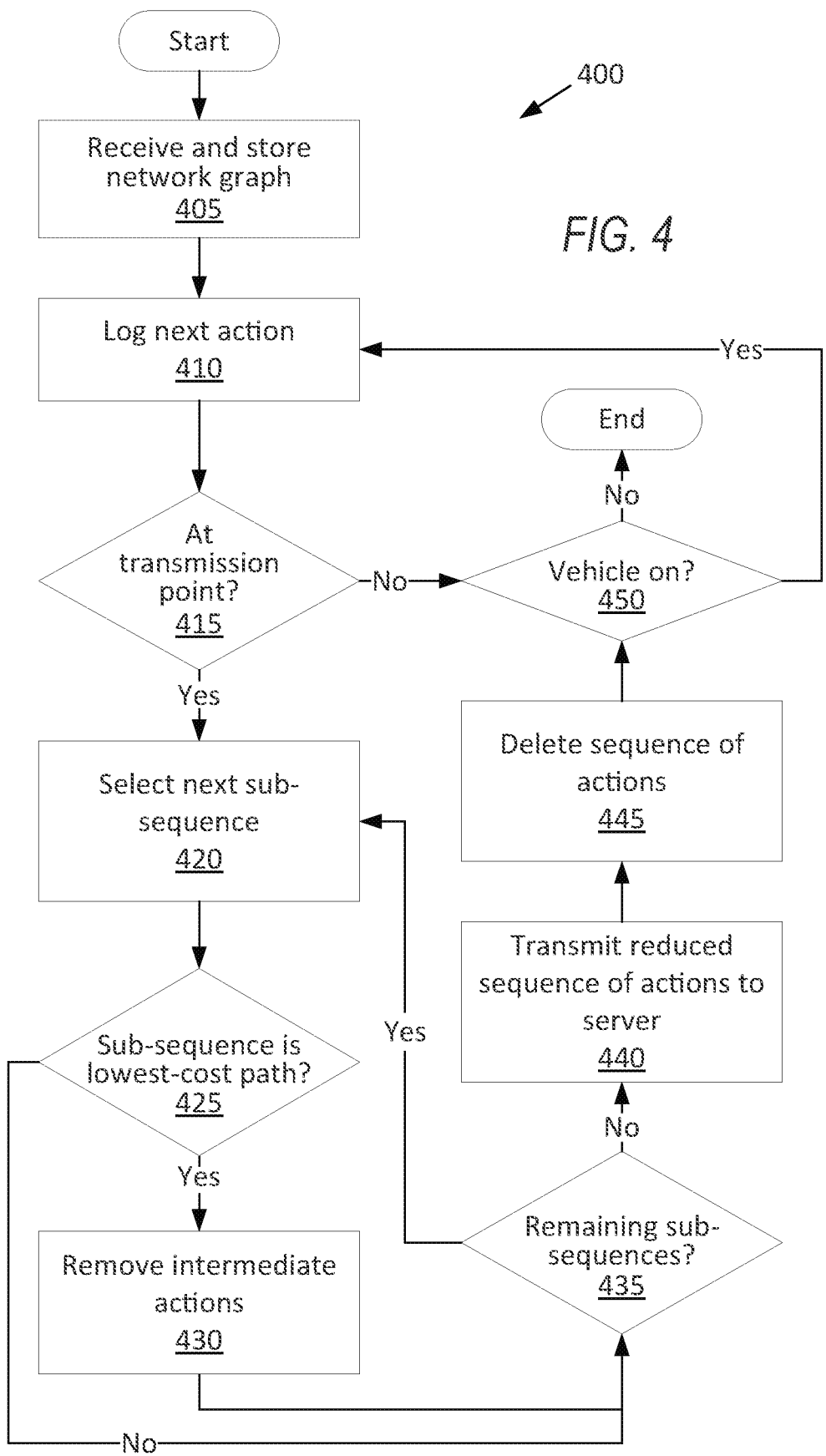
FIG. 4 is a process flow diagram of an example process for transmitting a reduced sequence of actions by the vehicle to the server.

FIG. 4 is a process flow diagram illustrating an example process 400 for the computer 200 to transmit the reduced sequence of the action 305 to the server 110. The memory of the computer 200 stores executable instructions for performing the steps of the process 400 and/or programming can be implemented in structures such as mentioned above. As a general overview of the process 400, the computer 200 receives the network graph 300 from the server 110 and stores the network graph 300. The computer 200 continuously logs actions 305 in the sequence and determines whether the vehicle 105 is at a transmission point. Whenever the vehicle 105 is at a transmission point, the computer 200 iterates through the sub-sequences of the sequence and, if the sub-sequence is a lowest-cost path, excludes the intermediate actions 305 from the sub-sequence. The computer 200 then transmits the resulting reduced sequence to the server 110 and deletes the sequence. The process 400 continues for as long as the vehicle 105 remains on.

The process 400 begins in a block 405, in which the computer 200 receives the network graph 300 from the server 110 and stores the network graph 300, as described above.

Next, in a block 410, the computer 200 logs a next action 305 in the sequence of the actions 305, as described above.

Next, in a decision block 415, the computer 200 determines whether the vehicle 105 is at a transmission point. The transmission point is a criterion of a time and place for transmitting the reduced sequence. For example, the computer 200 may determine whether a threshold time has elapsed or a threshold distance has been traveled since the last transmission. For another example, the computer 200 may determine whether a connection from the transceiver 220 to the network 115 is sufficiently strong to transmit the reduced sequence. For another example, the computer 200 may determine that a trip of the vehicle 105 has ended. If the vehicle 105 is at a transmission point, the process 400 proceeds to a block 420. If the vehicle 105 is not at a transmission point, the process 400 proceeds to a decision block 450.

In the block 420, the computer 200 selects the next sub-sequence from the sequence, as described above.

Next, in a decision block 425, the computer 200 determines whether the sub-sequence constitutes a lowest-cost path from the beginning action 305 of the sub-sequence to the final action 305 of the sub-sequence, as described above. Upon determining that the sub-sequence constitutes a lowest-cost path, the process 400 proceeds to a block 430. Upon determining that the sub-sequence does not constitute a lowest-cost path, the process 400 proceeds to a decision block 435.

In the block 430, the computer 200 stores the reduced sequence including the beginning action 305 and the final action 305 ordered immediately after the beginning action 305, with the intermediate actions 305 excluded, as described above. After the block 430, the process 400 proceeds to the decision block 435.

In the decision block 435, the computer 200 determines whether the computer 200 has iterated through all the sub-sequences of the sequence, as described above. If so, the process 400 proceeds to a block 440. If not, the process 400 returns to the block 420 to select the next sub-sequence.

In the block 440, the computer 200 transmits the reduced sequence to the server 110, as described above.

Next, in a block 445, the computer 200 deletes the sequence from memory. After the block 445, the process 400 proceeds to the decision block 450.

In the decision block 450, the computer 200 determines whether the vehicle 105 is still on. If so, the process 400 returns to the block 410 to log the next action 305 in the sequence. If not, the process 400 ends.

Figure 5:
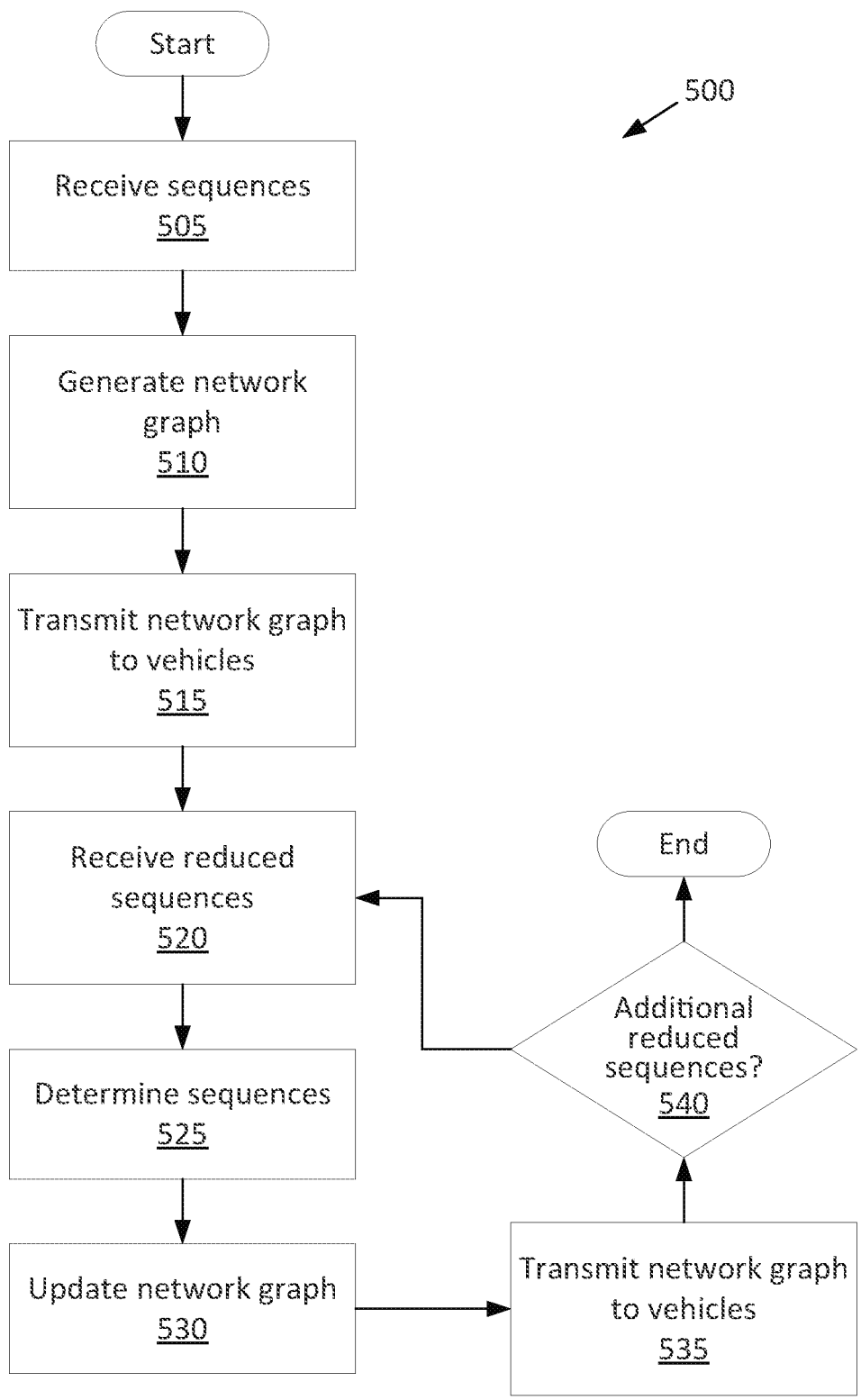
FIG. 5 is a process flow diagram of an example process for transmitting an updated network graph by the server to the vehicle.

FIG. 5 is a process flow diagram illustrating an example process 500 for the server 110 to transmit an updated network graph 300 to the vehicles 105. The memory of the server 110 stores executable instructions for performing the steps of the process 500 and/or programming can be implemented in structures such as mentioned above. As a general overview of the process 500, the server 110 receives a plurality of sequences from the vehicles 105, generates the network graph 300 from the sequences, and transmits the network graph 300 to the vehicles 105. When the server 110 receives one or more reduced sequences, the server 110 determines the sequences, updates the network graph 300, and transmits the updated network graph 300 to the vehicles 105.

The process 500 begins in a block 505, in which the server 110 receives a plurality of sequences from the vehicles 105. This initial plurality of sequences has not been reduced by the computers 200 on board the vehicles 105.

Next, in a block 510, the server 110 generates the network graph 300 based on the sequences, as described above.

Next, in a block 515, the server 110 transmits the network graph 300 to the vehicles 105. The set of vehicles 105 receiving the network graph 300 may be different than the set that transmitted the sequences in the block 505.

Next, in a block 520, the server 110 receives the reduced sequences from the vehicles 105, sent as described above with respect to the block 440.

Next, in a block 525, the server 110 determines the sequences from the reduced sequences based on the network graph 300, as described above.

Next, in a block 530, the server 110 updates the network graph 300 by changing the costs 315 of transitioning between the actions 305 in the network graph 300 based on the reduced sequences. For example, the server 110 can add the sequences determined in the block 525 from the reduced sequences to the historical data of the sequences received in the block 405 and then determine the probabilities as described above from the combined data. The server 110 can determine the costs 315 from the probabilities, as described above.

Next, in a block 535, the server 110 transmits the network graph 300 to the vehicles 105.

Next, in a decision block 540, the server 110 determines whether a new set of the reduced sequences is available from the vehicles 105. If so, the process 500 returns to the block 520 to receive the reduced sequences and further update the network graph 300. If not, the process 500 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising:
 a computer on board a vehicle, the computer storing a first copy of a network graph of actions performable by components of the vehicle, the network graph including costs of transitioning between the actions; and
 a server remote from the vehicle, the server storing a second copy of the network graph;
 wherein the computer is programmed to:
  log a sequence of the actions, the sequence including a first beginning action, a first at least one intermediate action ordered immediately after the first beginning action, a first final action ordered immediately after the first at least one intermediate action, a second beginning action, a second at least one intermediate action ordered immediately after the second beginning action, and a second final action ordered immediately after the at least one intermediate action;
  upon determining that the first beginning action, the first at least one intermediate action, and the first final action constitute a lowest-cost path from the first beginning action to the first final action based on the network graph, store a reduced sequence including the first beginning action and the first final action ordered immediately after the first beginning action, the reduced sequence excluding the first at least one intermediate action;
  upon determining that the second beginning action, the second at least one intermediate action, and the second final action do not constitute a lowest-cost path from the beginning action to the final action based on the network graph, include the second beginning action, the second at least one intermediate action, and the second final action in the reduced sequence; and transmit the reduced sequence to the server; and the server is programmed to determine the sequence from the reduced sequence based on the network graph.

2. The system of claim 1, wherein the programming on the server to determine the sequence includes programming to insert the first at least one intermediate action from the lowest-cost path from the first beginning action to the first final action into the reduced sequence between the first beginning action and the first final action.

3. The system of claim 1, wherein the vehicle is a first vehicle, and the server is further programmed to generate the second copy of the network graph based on data from a plurality of second vehicles, and transmit the first copy of the network graph to the first vehicle.

4. The system of claim 1, wherein the server is further programmed to change the costs of transitioning between the actions in the second copy of the network graph based on the reduced sequence.

5. A computer comprising a processor and a memory, the memory storing instructions executable by the processor to:

store a network graph of actions performable by components of a vehicle, the network graph including costs of transitioning between the actions;

log a sequence of the actions, the sequence including a first beginning action, a first at least one intermediate action ordered immediately after the first beginning action, a first final action ordered immediately after the first at least one intermediate action, a second beginning action, a second at least one intermediate action ordered immediately after the second beginning action, and a second final action ordered immediately after the at least one intermediate action;

upon determining that the first beginning action, the first at least one intermediate action, and the first final action constitute a lowest-cost path from the first beginning action to the first final action based on the network graph, store a reduced sequence including the first beginning action and the first final action ordered immediately after the first beginning action, the reduced sequence excluding the first at least one intermediate action;

upon determining that the second beginning action, the second at least one intermediate action, and the second final action do not constitute a lowest-cost path from the beginning action to the final action based on the network graph, include the second beginning action, the second at least one intermediate action, and the second final action in the reduced sequence; and transmit the reduced sequence to a server remote from the vehicle.

6. The computer of claim 5, wherein the actions include commands inputtable by an occupant of the vehicle.

7. The computer of claim 5, wherein the instructions further include instructions to determine a cost of transitioning through the first beginning action, the first at least one intermediate action, and the first final action.

8. The computer of claim 7, wherein determining the cost includes summing the costs of transitioning between the actions from the first beginning action through the first at least one intermediate action to the first final action from the network graph.

9. The computer of claim 7, wherein the instructions further include instructions to determine a lowest cost of the lowest-cost path from the first beginning action to the first final action from the network graph, wherein determining that the first beginning action, the first at least one intermediate action, and the first final action constitute a lowest-cost path from the first beginning action to the first final action includes determining that the cost equals the lowest cost.

10. The computer of claim 5, wherein the costs of transitioning between the actions are based on probabilities of transitioning between the actions.

11. The computer of claim 10, wherein the costs of transitioning between the actions are based only on the probabilities of transitioning between the actions.

12. The computer of claim 10, wherein each cost of transitioning between a pair of the actions equals one minus the probability of transitioning between the pair of the actions.

13. The computer of claim 10, wherein the probabilities are based on averages of historical data of transitioning between the actions.

14. The computer of claim 13, wherein the vehicle is a first vehicle, and the historical data is from a plurality of second vehicles.

15. The computer of claim 5, wherein the first at least one intermediate action includes a first intermediate action, at least one second intermediate action immediately after the first intermediate action, and a third intermediate action immediately after the at least one second intermediate action; and the instructions further include instructions to, upon determining that the first beginning action, the first at least one intermediate action, and the first final action do not constitute a lowest-cost path from the first beginning action to the first final action based on the network graph and determining that the first intermediate action, the at least one second intermediate action, and the third intermediate action constitute a lowest-cost path from the first intermediate action to the third intermediate action based on the network graph, include the first intermediate action and the third intermediate action in the reduced sequence and exclude the at least one second intermediate action from the reduced sequence.

16. The computer of claim 5, wherein the instructions further include instructions to receive the network graph from the server.

17. The computer of claim 5, wherein the network graph is a directed graph.

18. The computer of claim 5, wherein the network graph is a weighted graph with the costs of transitioning serving as weights of the weighted graph.

19. A method comprising:

storing a network graph of actions performable by components of a vehicle, the network graph including costs of transitioning between the actions;

logging a sequence of the actions, the sequence including a first beginning action, a first at least one intermediate action ordered immediately after the first beginning action, a first final action ordered immediately after the first at least one intermediate action, a second beginning action, a second at least one intermediate action ordered immediately after the second beginning action, and a second final action ordered immediately after the at least one intermediate action;

upon determining that the first beginning action, the first at least one intermediate action, and the first final action constitute a lowest-cost path from the first beginning action to the first final action based on the network graph, storing a reduced sequence including the first beginning action and the first final action ordered immediately after the first beginning action, the reduced sequence excluding the first at least one intermediate action;

upon determining that the second beginning action, the second at least one intermediate action, and the second final action do not constitute a lowest-cost path from the beginning action to the final action based on the network graph, including the second beginning action, the second at least one intermediate action, and the second final action in the reduced sequence; and transmitting the reduced sequence to a server remote from the vehicle.

* * * * *